United States Patent [19]

McIlwain

[11] 4,187,666
[45] Feb. 12, 1980

[54] BALER PICKUP COUNTER BALANCING MEANS

[75] Inventor: Irwin D. McIlwain, Lancaster, Pa.

[73] Assignee: Sperry Rand Corporation, New Holland, Pa.

[21] Appl. No.: 809,889

[22] Filed: Jun. 24, 1977

[51] Int. Cl.² .................................. A10D 39/00
[52] U.S. Cl. .................................. 56/341; 56/364
[58] Field of Search ............... 56/341, 364, 344, 342, 56/343; 254/67, 160; 188/79.5 GT; 238/125–128, 130; 104/140

[56] References Cited

U.S. PATENT DOCUMENTS

| | | | |
|---|---|---|---|
| 1,787,308 | 12/1930 | Furlong | 40/16 |
| 2,013,951 | 9/1935 | Eskew | 254/67 |
| 2,566,150 | 8/1951 | Wilson | 188/79.5 GT |
| 2,588,501 | 3/1952 | Dummer | 254/67 |
| 2,818,229 | 12/1957 | Guthans | 254/67 |
| 2,885,032 | 5/1959 | Dombeck | 188/79.5 GT |
| 2,921,426 | 1/1960 | Heth | 56/341 |
| 3,028,645 | 4/1962 | Stearman et al. | 254/67 |
| 3,195,689 | 7/1965 | Ryskamp | 188/79.5 GT |
| 3,684,026 | 8/1972 | Reuter et al. | 56/341 |
| 3,798,885 | 3/1974 | Glass et al. | 56/364 |
| 3,984,969 | 12/1976 | Yatcilla | 56/354 |

*Primary Examiner*—Louis G. Mancene
*Assistant Examiner*—Paul J. Hirsch
*Attorney, Agent, or Firm*—John B. Mitchell; Frank A. Seemar; Ralph D'Alessandro

[57] ABSTRACT

A baler having an improved pickup counterbalance mechanism is disclosed. The improved mechanism includes biased pivot cranks connected to each end of the pickup and a variable length connector slideably fixed between the biasing means to provide a single adjustment for effectively equalizing the counterbalance forces on the two lateral ends of the pickup.

10 Claims, 4 Drawing Figures

BALER PICKUP COUNTER BALANCING MEANS

BACKGROUND OF THE INVENTION

This invention relates generally to a baler, and specifically to an improved counterbalancing mechanism for the pickup of a baler.

The instant invention is in the nature of a general improvement over the counterbalancing system disclosed in U.S. Pat. No. 3,984,969. FIG. 1 of that patent shows a dual pivot crank counterbalancing system which requires individual adjustment of the biasing means used to support the weight of the pickup.

Other prior art counterbalancing systems, such as that shown in U.S. Pat. No. 3,798,885, discloses the use of a relatively long low rate tension spring (or a pair of such springs connected in series) disposed parallel and above the baler pickup, and a sheave rotatably supported on the baler above one end of the pickup and a cable and link assembly interconnecting the spring and the one end of the pickup. The cable is connected to one end of the spring and extends horizontally therefrom to and about the sheave and then extends downwardly to its connection with an upper end of the link. The link is pivotally connected at its lower end to the one end of the pickup such that the moment arm of the upward lifting force about the pickup pivot point will increase as the spring load decreases.

While the prior art systems have, in an overall sense, proven to be satisfactory, some disadvantages have been discovered.

One disadvantage relates to the difficulty with which an operator adjusts the counterbalancing forces on the two ends of the pickup. Separate adjustment to obtain equal counterbalancing forces is extremely difficult, and, in reality, never actually obtained.

Another disadvantage of the prior art systems is that they have no practical means of compensating for different deflection of the two pivot cranks. It is very seldom that the forces encountered by the pickup are equally distributed along its length, and thus the ends tend to deflect different amounts. None of the prior art systems take this fact into account by structurally compensating for the absorption of uneven forces.

SUMMARY OF THE INVENTION

It is therefore an object of this invention to provide a pickup counterbalance mechanism which floats both ends of the pickup to prevent binding and permanent distortion of the pickup frame.

It is another object of this invention to provide a pickup counterbalance mechanism which provides for a single adjustment between the biasing springs.

It is another object of this invention to provide a pickup counterbalance system for both ends of the pickup which easily and readily balances the forces on the two ends.

It is another object of this invention to provide a pickup counterbalance mechanism which is simple of construction, inexpensive of manufacture and extremely effective in use.

It is a further object of this invention to provide a counterbalance mechanism which maintains equal counterbalancing forces on the ends of the pickup.

It is a still further object of this invention to provide a pickup counterbalance system which allows the pickup to float at a stable attitude relative to the ground, and easily follow the pickup wheel.

It is an even still further object of this invention to provide a pickup counterbalance mechanism which allows the pickup to be easily manually repositioned, especially at the top end of the pivot arc.

These and other objects are obtained according to the instant invention by providing a baler having an improved pickup counterbalance mechanism. The improved mechanism includes biased pivot cranks connected to each end of the pickup and a variable length connector slidably fixed between the biasing means to provide a single adjustment for effectively equalizing the counterbalance forces on the two ends of the pickup.

BRIEF DESCRIPTION OF THE DRAWINGS

For a better understanding of the invention as well as other objects and further features thereof, reference made to the following detailed disclosure of the preferred embodiment of the invention taken in conjunction with the accompanying drawings thereof wherein:

FIG. 4 is a view of the coupling mechanism taken along line 4—4 of FIG. 3.

DESCRIPTION OF THE PREFERRED EMBODIMENT

Figure 1:
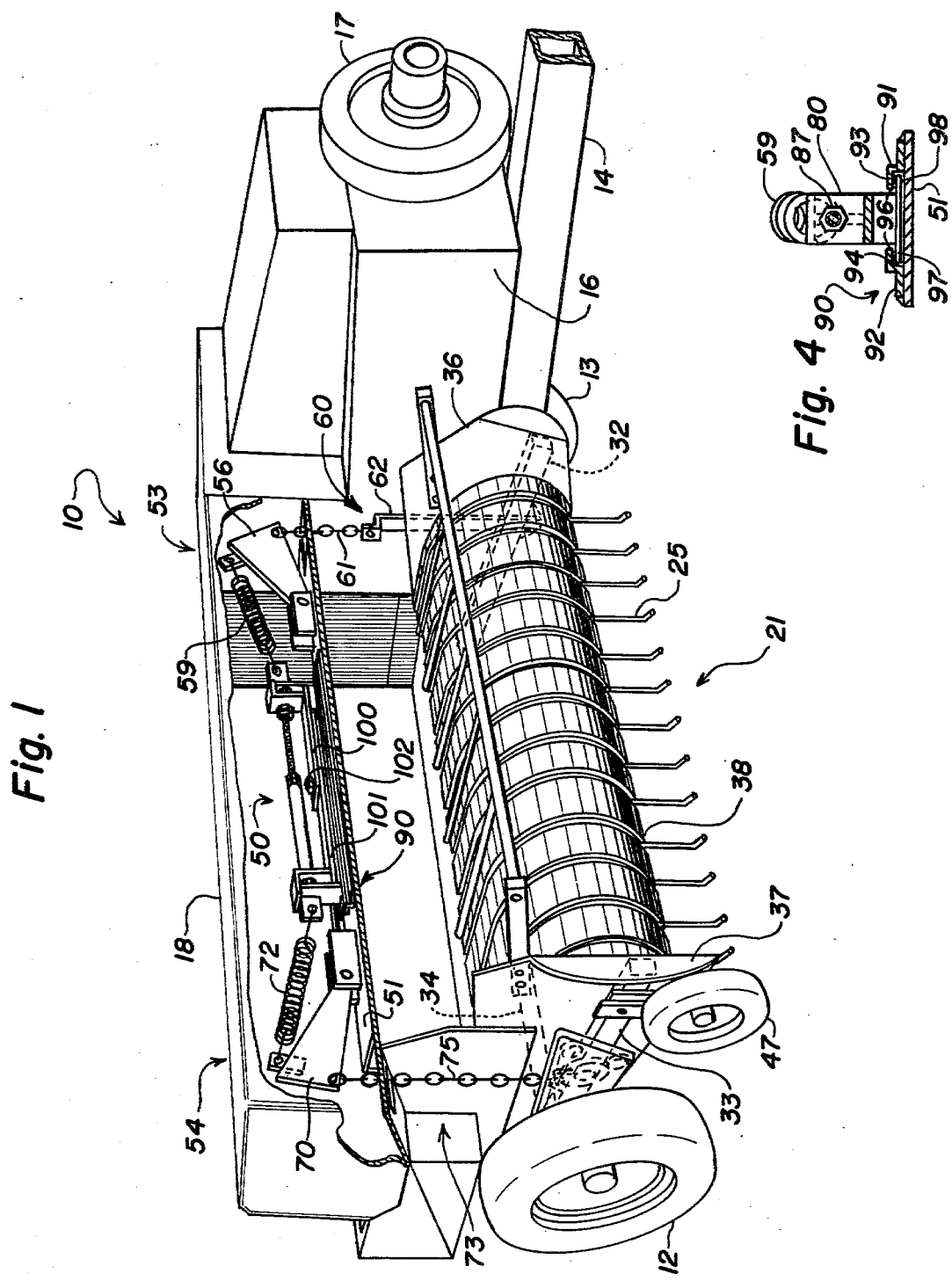
FIG. 1 is a perspective view of a baler with portions broken away and shown in section to illustrate the improved counterbalancing mechanism of the instant invention.

Referring now to the drawings, and particularly to FIG. 1, there is shown a hay baler, generally indicated by the numeral 10. The baler 10 includes a frame 11 (partially seen in FIG. 2) supported and made mobile by right and left ground-engaging wheels 12 and 13 rotatably mounted on right and left spindles (not shown) being connected to and extending outwardly from respective opposite sides of the frame 11. The baler has a tongue 14 pivotally connected to the frame 11 and extending forwardly of the baler. When connected to the drawbar of a tractor (not shown), the baler 10 may be towed across a field.

The baler 10 further includes a fore-and-aft extending bale case or chamber 16 on the frame 11 having a forward end on which a flywheel 17 is rotatably mounted, a feeder housing 18 transversely mounted on the frame 11 adjacent the right side of the bale chamber 16 within which is mounted a feeding mechanism 19 (see FIG. 2) adapted to convey crop material into the bale chamber 16 through an inlet opening 20, and a pickup assembly 21 mounted on the frame 11 forwardly of and below the feeder housing 18 and adapted to lift crop material from the field and deliver it to the feeding mechanism 19.

A plunger (not shown) is mounted for reciprocable movement in the bale chamber 16 for forming the crop material conveyed therein through inlet opening 20 into rectangular bales. As the bales are formed in the bale chamber 16, they move progressively toward the rear end of the bale chamber 26. After each bale is completed, it is banded with a suitable tying medium and, subsequently, emerges from the rear or discharge end of the bale chamber.

The power necessary for operation of the various baler mechanisms is transmitted from the tractor to the flywheel 17 through a power takeoff (not shown). The rotary power transmitted to the flywheel is transferred therefrom to the various other components through means not shown.

Figure 2:
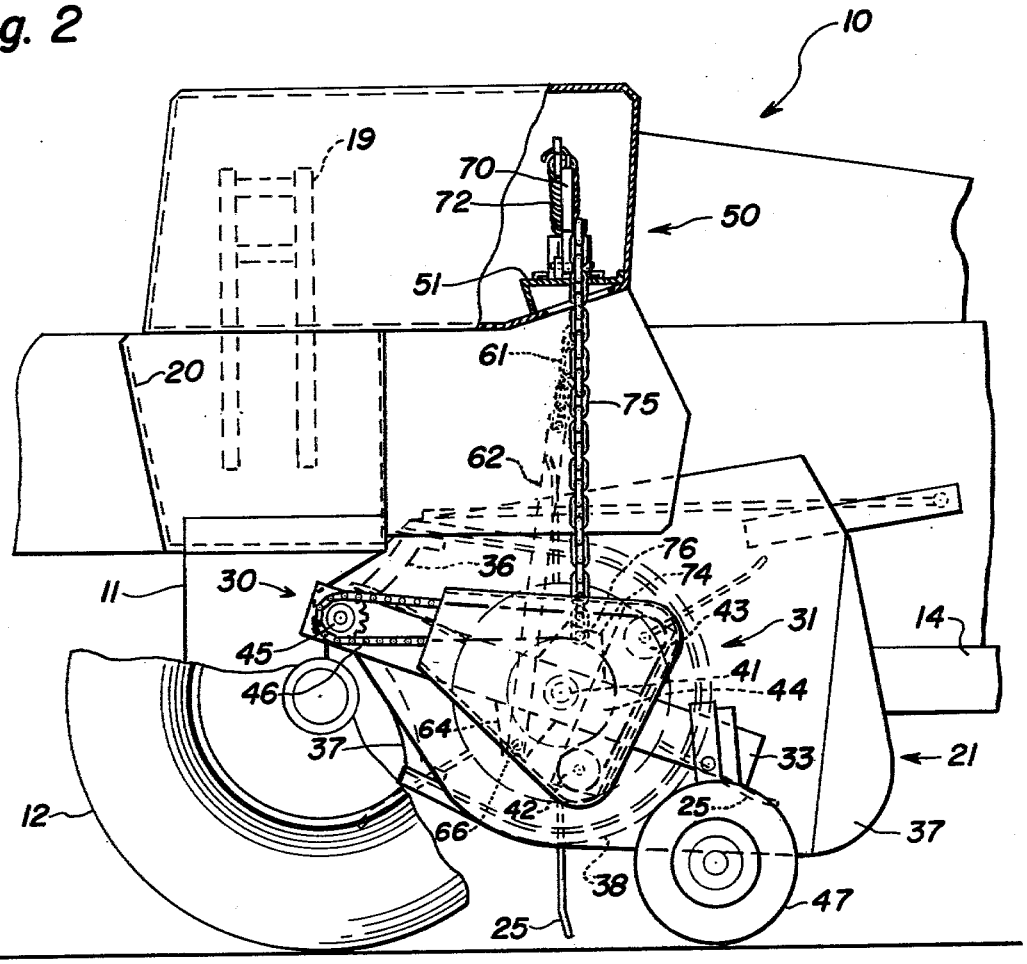
FIG. 2 is a side elevational view of the baler of FIG. 1 with portions broken away and shown in section to also better illustrate the instant invention.

The pickup assembly 21 is, as previously mentioned, disposed forwardly of and below the feeder housing 18 of the baler 10. As seen in FIGS. 1 and 2, the pickup assembly comprises a pivot means, generally designated 30, and a pickup means, generally designated 31.

The pivot means 30 includes an inboard pivot arm 32 and an outboard pivot arm 33, both mounted to transverse extending pivotable tubular member 34. Member 34 is supported on frame 11 by braces (not shown).

Pivot means 31 includes a plurality of upper and lower pickup guard supports, 36 and 37 secured at their rearward ends to the tubular member 34 in spaced apart relationship with pivot arms 32 and 33. Spaced apart pivot guards 38 are secured to the forward portion of each of the upper and lower pickup guard supports, 36 and 37. Inboard and outboard pickup side sheet members 39 and 40 are secured, respectively, to the inner sides of pivot arms 32 and 33.

A tubular shaft 41 extends transversely between, and is rotatably mounted on its opposite ends, respectively, to pivot arms 32 and 33. Shaft 41 supports in conventional manner a plurality of pickup tines 25 which are aligned so as to extend outwardly through respective spaces between pickup guards 38 during rotation of the shaft 41. The shaft 41 is caused to rotate in a counterclockwise direction, as viewed in FIG. 2, by a generally conventional drive mechanism comprised of sprockets 42–45 and endless chain 46 on the outboard end of the pickup mechanism 21.

In FIGS. 1 and 2, the pickup means 31 is shown in its lowered operating position for picking up crop material from the field and feeding it into the feeder housing 18 as the baler is towed across the field. In this position, the height of the pickup means 31 above the field is gauged by a ground-engaging wheel 47 which is adjustably supported by the outboard pivot arm 33.

As the baler 10 advances in a forward direction across the field, the moving pickup tines 25 will engage crop material lying on the field and lift it upwardly and rearwardly toward the feeder housing 18 while the wheel 47 will ride along the field causing the pickup means 31 to vertically swing as uneven contours are encountered by the baler 10. In order to prevent too much force from being imposed upon the wheel 47, and for other reasons, it has been conventional practice to counterbalance a substantial portion of the weight of the pickup means 31.

The improved counterbalance mechanism of the instant invention, generally designated 50, is preferably located above pickup assembly 21 where it may advantageously support both the inboard and outboard ends thereof. Feeder housing 18 includes a substantially rigid horizontal elongate plate 51 extending along the length thereof from adjacent the inboard end to adjacent the outboard end. The components of the counterbalance mechanism 50 are, for the most part, mounted on plate 51.

Figure 3:
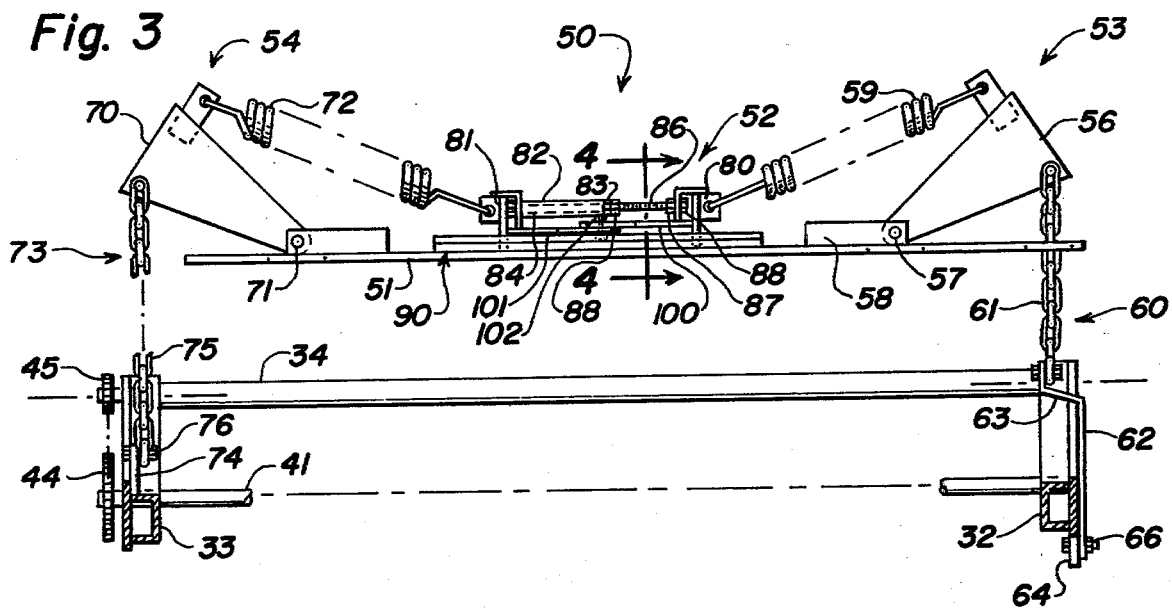
FIG. 3 is a partial front view of the baler showing the major elements of the counterbalancing system of the instant invention.

Counterbalance mechanism 50, best seen in FIG. 3, comprises a coupling means 52 and two end-mounted pivot cranks 53,54 connected to pivot arms 32 and 33.

Pivot crank 53 includes a lever 56 pivotally connected at 57 to plate 51 via bracket 58. Lever 56 is biased upwardly by a spring 59 fixed at its opposite end to coupling means 52. A connector 60 is affixed between pivot arm 32 and an end portion of lever 56 such that the vertical movement of pivot arm 32 is transferred into a rotational movement of lever 56. Connector 60 has a flexible portion such as chain 61, and a rigid portion, such as strap 62. Because of space considerations and interference problems on the inboard end of pickup assembly 21, strap 62 is formed with a bend, 63, therein to permit attachment to plate 64 on pivot arm 32. Strap 62 is pivotally connected to pivot arm 32 by bolt 66 below the axis of the pivot arm to promote the strength of the coupling.

Similarly, pivot crank 54 includes a lever 70 pivotable about point 71, a spring 72 and a connector 73. A plate 74 is affixed to the top of pivot arm 33 and pivotally connected to chain 75 by a bolt 76. Because of interference with the pickup drive mechanism, sprockets 42–45, the connection between chain 75 and pivot arm 33 is made above the axis of the arm.

As can best be seen in FIG. 2, the connection points 66 and 76 between connectors 60,73 and pivot arms 32,33 are not in the same vertical plane. Pivot point 66 is spaced rearwardly of pivot point 76 because of additional clearance problems on the inboard end of the pickup assembly 21.

Coupling means 52 comprises end elements 80 and 81 connected, respectively, to springs 59 and 72. End element 81 includes an elongate tubular portion 82 having an internally threaded nut, 83, fixed thereto in alignment with an internal bore 84. A threaded bolt 86 is fixed on one end to end element 80 by nuts 87,88 and threadably engaged at the other end with nut 83 on end element 81. Threaded nuts 87 and 88 serve to lock the bolt 86 in selected location.

A keeper, or track, 90 is affixed to plate 51 and extends longitudinally between pivot cranks 53 and 54. Keeper 90 comprises two longitudinal angular members 91 and 92 having bends therein to form channels 93 and 94 with plate 51. Members 91 and 92 are also spaced apart to form a longitudinal slot 96 therebetween. Each end member 80,81 has an end configuration which is roughly an inverted T-shaped (see FIG. 4 which shows element 80). The horizontal arms 97,98 of his configuration cooperatively fit within channels 93 and 94 of the keeper to allow the coupling means 52 to move only in a horizontal direction along the keeper.

Each end element 80,81 of coupling means 52 further includes a brace 100 and 101, respectively, which are fixed together by a bolt 102. Either brace 100 or 101, or both, has a slot therein to permit adjustment of the spacing between the end elements.

In operation, the pickup assembly 21 is subjected to unequal forces along its length which tend to twist its frame through various planes thereof. The counterbalance mechanism described above, because of the sliding action of the coupling means 52, reacts to these forces by equalizing the tension in the springs 59 and 72 to compensate for the forces and overcome the twisting tendency. The single adjustment location, in combination with the slide action, always insures that the two counterbalance forces are equal and thus proper. Furthermore, because it is not always possible to align the connector pivot points (66 and 76) the single slide action insures the proper balance even though levers 56 and 70 may swing through different length arcs.

It will be understood that various changes in the details, materials, steps and arrangements of parts, which have herein been described and illustrated in order to explain the nature of the invention, will occur to and may be made by those skilled in the art upon a reading of the disclosure within the principles and scope of the invention.

Having thus described the invention, what is claimed is:

1. In a baler having a mobile frame adapted to move across a field, means on said frame operable to receive crop materials and form said materials into bales and a pickup assembly including pivot means on said frame and pickup means disposed generally forwardly of said pivot means and operable to pick up crop materials from the field and feed said materials to said receiving and forming means, said pickup means being connected to said pivot means for vertical swinging movement about a generally horizontal axis defined by said pivot means, a counterbalance means for said pickup including a pair of aligned pivot cranks fixed to said frame generally above said pickup means, one of said pair of pivot cranks positioned above each lateral end of said pickup means and fixed thereto for swinging movement in a plane parallel to the longitudinal axis of the pickup means, each said pivot crank including a resilient biasing means having a first end connected to the pivot crank and a second end affixed to said frame such that said pivot cranks are urged in a direction to counterbalance said pickup means, an improved mechanism for adjusting the counterbalance forces comprising:

an elongate keeper means affixed to said frame with its longitudinal axis directed along a line between said pivot cranks;

a variable length coupling means fixed to each of said resilient biasing means at the second ends thereof whereby variation of the length of said coupling means correspondingly changes the distance between said second ends; and said coupling means is slidingly engaged with said keeper means.

2. The baler of claim 1, wherein:
said variable length coupling means comprises first and second end elements adjustably connected together by a threaded member, said first and second end elements connected, respectively, to one of said resilient biasing means; and
said first and second end elements are each slidingly engaged with said elongate keeper means.

3. The baler of claim 2, wherein:
said first and second end elements each include an inverted T-shaped member; and
said elongate keeper means includes elongate spaced apart angular members which engage and slidingly retain the horizontal portions of said inverted T-shaped members.

4. The baler of claim 3, wherein:
said angular members form a slot therebetween and laterally opposing spaced apart retaining channels for slidingly engaging said inverted T-shaped members.

5. The baler of claim 4, wherein:
said variable length coupling means further includes first and second brace elements fixed, respectively, to said first and second end elements and adjustably connected together.

6. In a baler having a mobile frame adapted to move across a field, means on said frame operable to receive crop materials and form said materials into bales and a pickup assembly including pivot means on said frame and pickup means disposed generally forwardly of said pivot means and operable to pick up crop materials from the field and feed said materials to said receiving and forming means, said pivot means including first and second spaced apart pivot arms connected respectively to the lateral inboard and outboard ends of said pickup means for vertical swinging movement about a generally horizontal axis rearward of said pickup means, an improved means to counterbalance said pickup means comprising:

a first pivot crank fixed to said frame generally above the inboard end of said pickup means;

a first support arm connected between said first pivot crank and said first pivot arm at a point substantially vertically below said first pivot crank;

a second pivot crank fixed to said frame generally above the outboard end of said pickup means;

a second support arm connected between said second pivot crank and said second pivot arm at a point offset rearwardly from a vertical plane through the second pivot crank connection;

an elongate keeper means affixed to said frame substantially intermediate said first and second pivot cranks, the longitudinal axis of said keeper means directed along a line between said first and second pivot cranks;

a variable length coupling means slidingly engaged with said keeper means, said coupling means having a first end element adjacent said first pivot crank and a second end element adjacent said second pivot crank;

first resilient biasing means fixed between said first pivot crank and said first end of said coupling means; and second resilient biasing means fixed between said second pivot crank and said second end of said coupling means.

7. The baler of claim 6, wherein:
said first and second end elements of said variable length coupling means are adjustably connected together by a threaded member, and
said first and second end elements are each slidingly engaged with said elongate keeper means.

8. The baler of claim 7, wherein:
said first and second end elements each include an inverted T-shaped member; and
said elongate keeper means includes elongate spaced apart angular members which engage and slidingly retain the horizontal portions of said inverted T-shaped members.

9. The baler of claim 8, wherein:
said angular members form a slot therebetween and laterally opposing spaced apart retaining channels for slidingly engaging said inverted T-shaped members.

10. The baler of claim 9, wherein:
said variable length coupling means further includes first and second brace elements fixed, respectively, to said first and second end elements and adjustably connected together.

* * * * *